(12) United States Patent
Tsunaki et al.

(10) Patent No.: US 9,843,028 B2
(45) Date of Patent: Dec. 12, 2017

(54) SECONDARY BATTERY

(71) Applicant: Hitachi Automotive Systems, Ltd., Hitachinaka-shi, Ibaraki (JP)

(72) Inventors: Takuro Tsunaki, Hitachinaka (JP); Masaaki Iwasa, Hitachinaka (JP); Takashi Sasaki, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 87 days.

(21) Appl. No.: 15/177,771

(22) Filed: Jun. 9, 2016

(65) Prior Publication Data

US 2016/0293919 A1 Oct. 6, 2016

Related U.S. Application Data

(63) Continuation of application No. 14/112,146, filed as application No. PCT/JP2011/059536 on Apr. 18, 2011, now Pat. No. 9,391,308.

(51) Int. Cl.
*H01M 2/12* (2006.01)
*H01M 10/0587* (2010.01)
*H01M 10/0525* (2010.01)
*H01M 10/04* (2006.01)
*H01M 2/02* (2006.01)

(52) U.S. Cl.
CPC ....... *H01M 2/1252* (2013.01); *H01M 2/0217* (2013.01); *H01M 10/0431* (2013.01); *H01M 10/0525* (2013.01); *H01M 10/0587* (2013.01); *H01M 2220/20* (2013.01); *Y02T 10/7011* (2013.01)

(58) Field of Classification Search
CPC ........ H01M 2/02; H01M 2/0217; H01M 2/12; H01M 2/1252; H01M 10/04; H01M 10/0431; H01M 10/0525; H01M 10/0587
See application file for complete search history.

(56) References Cited

FOREIGN PATENT DOCUMENTS

| JP | 10-162801 A | 6/1998 | | |
|---|---|---|---|---|
| JP | 2006-244756 A | 9/2006 | | |
| JP | 2007-220418 A | 8/2007 | | |
| JP | 2007220418 A | * 8/2007 | .............. | H01M 2/12 |
| JP | 2009-289741 A | 12/2009 | | |
| JP | 2010-113816 A | 5/2010 | | |
| JP | 2011-070871 A | 4/2011 | | |

* cited by examiner

*Primary Examiner* — Karie O'Neill Apicella
(74) *Attorney, Agent, or Firm* — Volpe and Koenig, P.C.

(57) ABSTRACT

A secondary battery typified by a lithium-ion secondary battery includes a battery outer container in which a gas release valve and positive and negative electrode external terminals are provided, an electrode group in which positive and negative plates are stacked with a separator interposed therebetween and current collection portions are provided at both ends, and positive and negative electrode current collectors forming a current path from the current collection portions of the electrode group to the positive and negative electrode external terminals, and the cross-sectional area of a gas exhaust flow channel through which gas generated inside the electrode group is discharged from the gas release valve is set so as to increase in a downstream direction.

10 Claims, 12 Drawing Sheets

[FIG. 1]
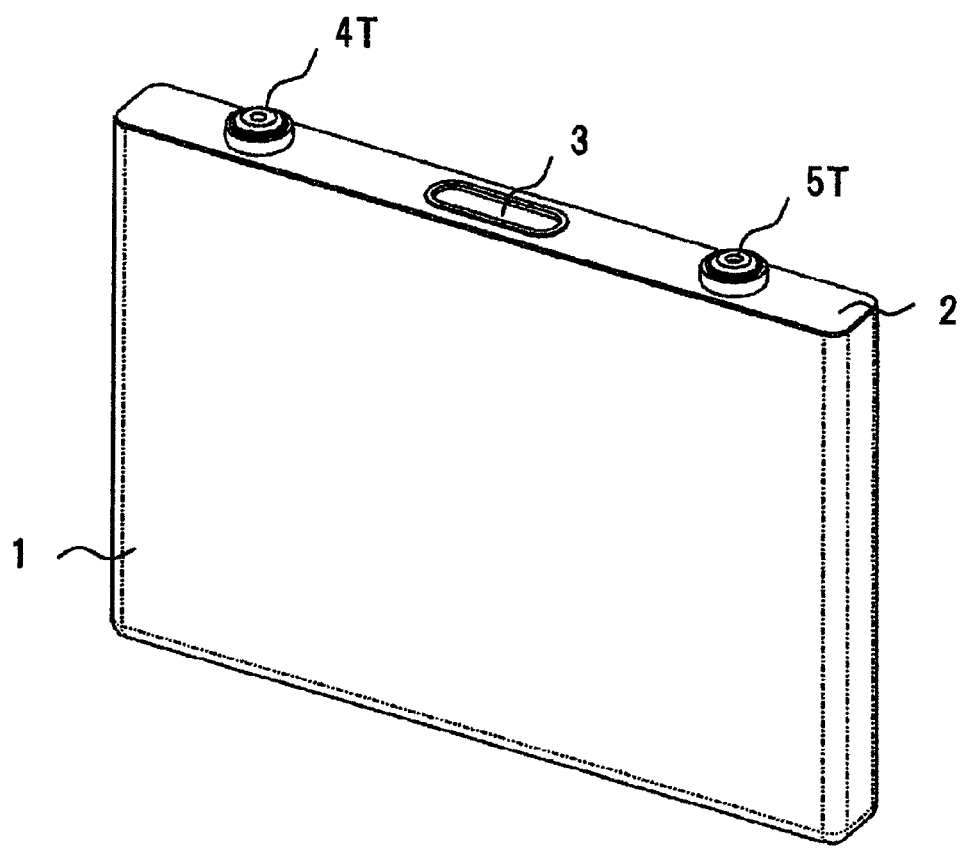

[FIG. 2]
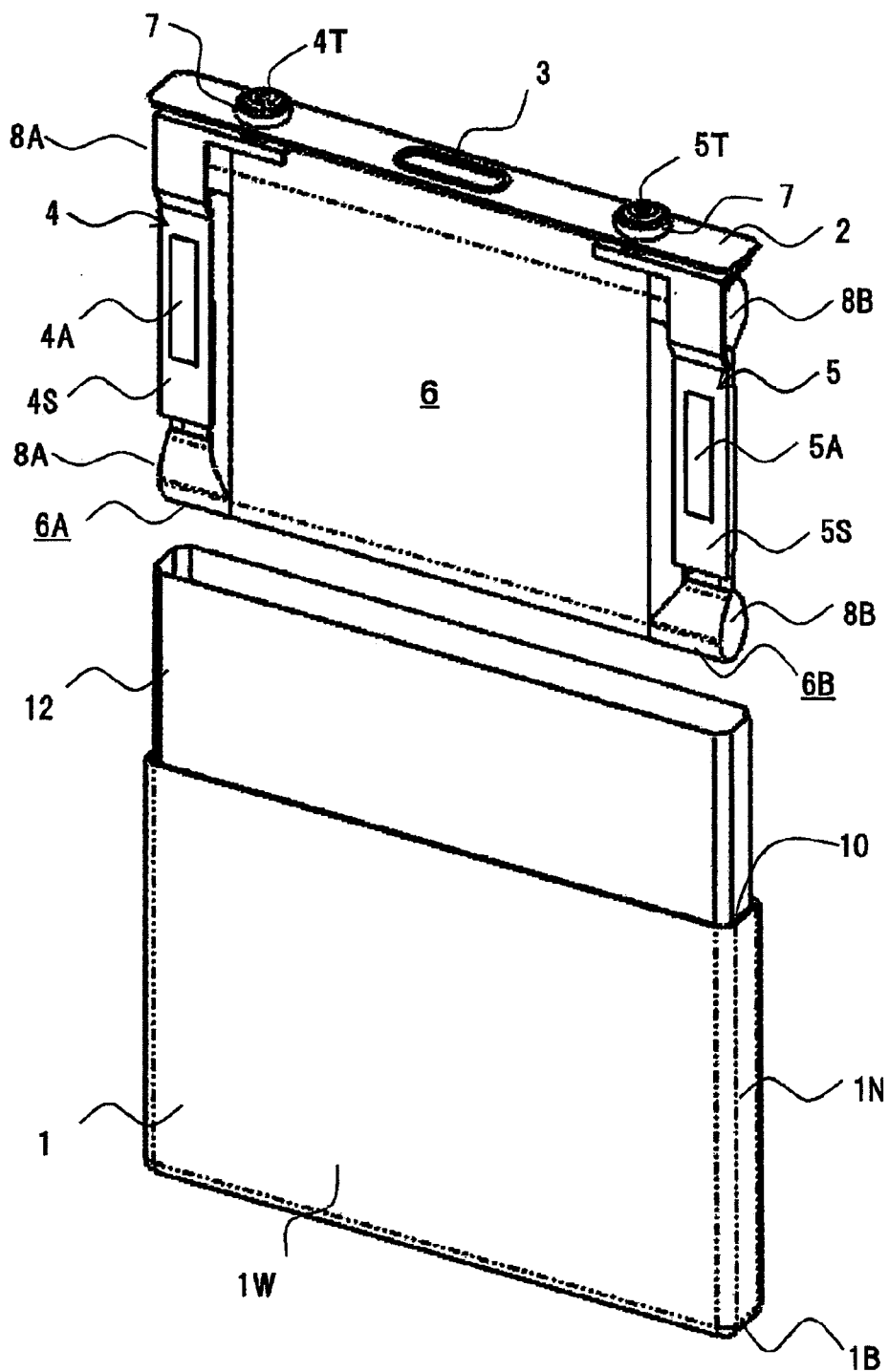

[FIG. 3A]
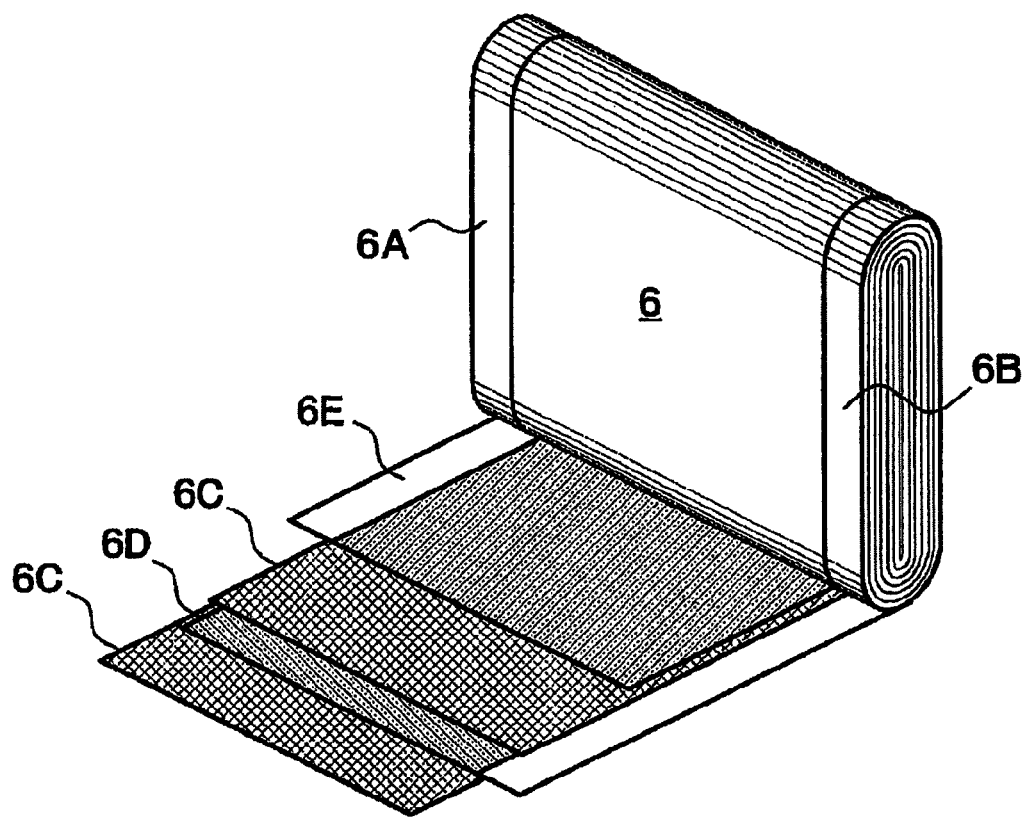

[FIG. 3B]
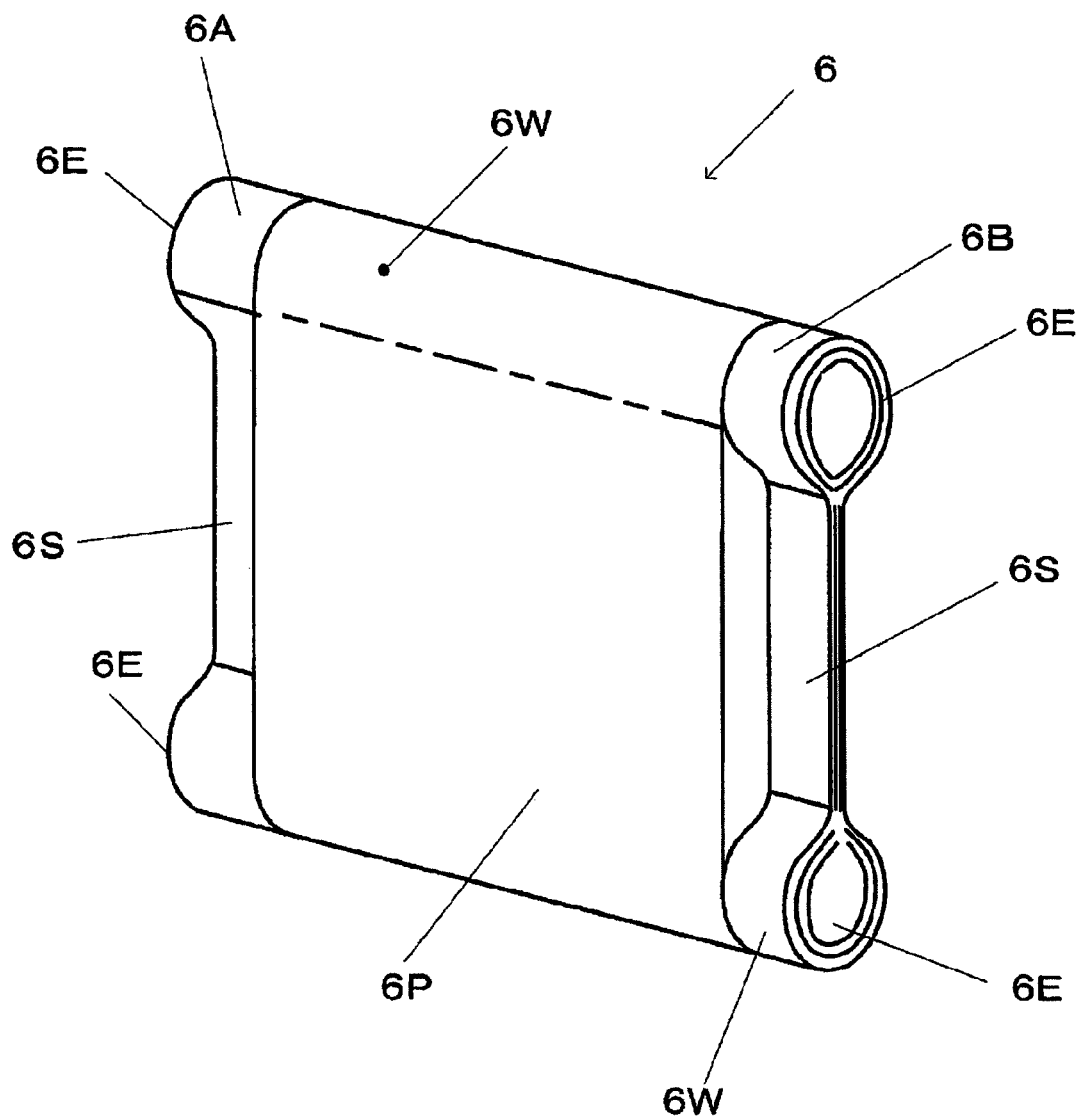

[FIG. 4]
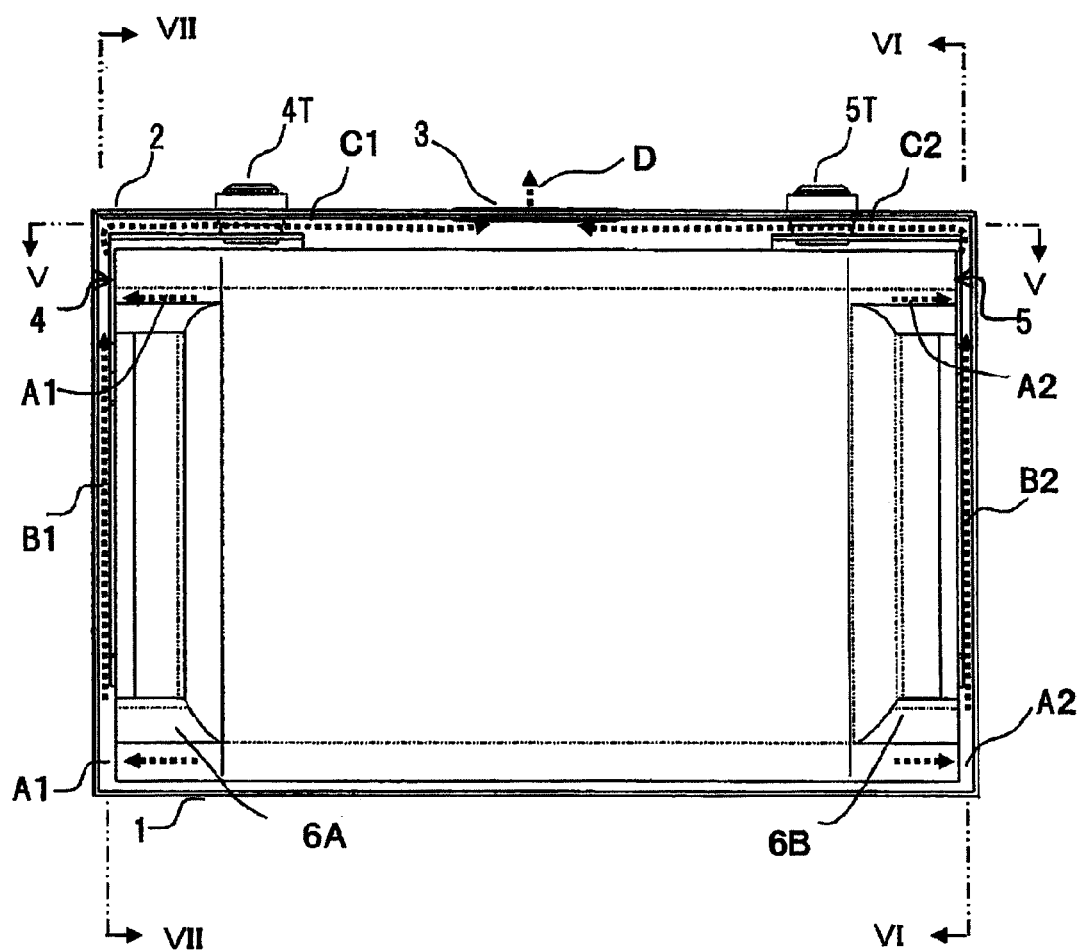

[FIG. 5]
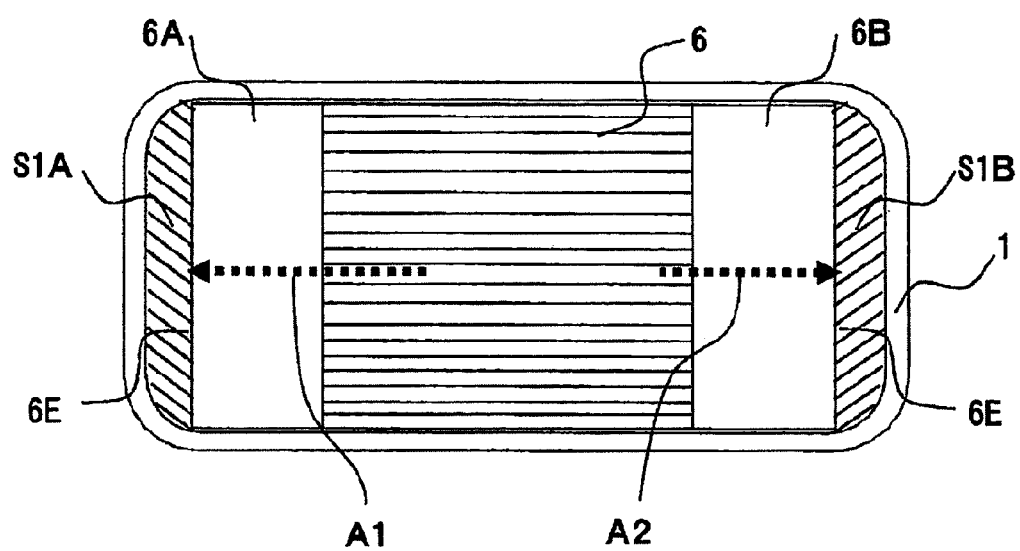

[FIG. 6]
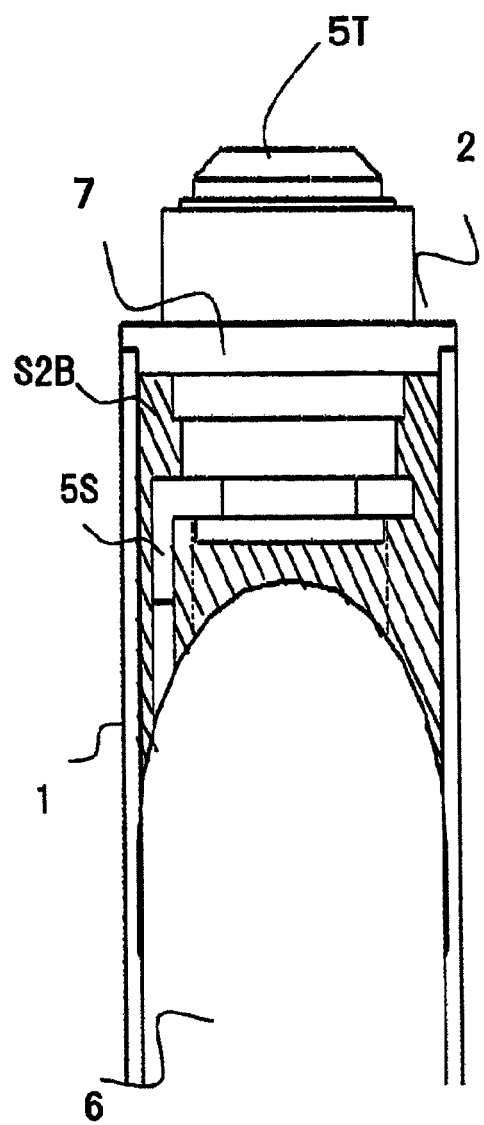

[FIG. 7]
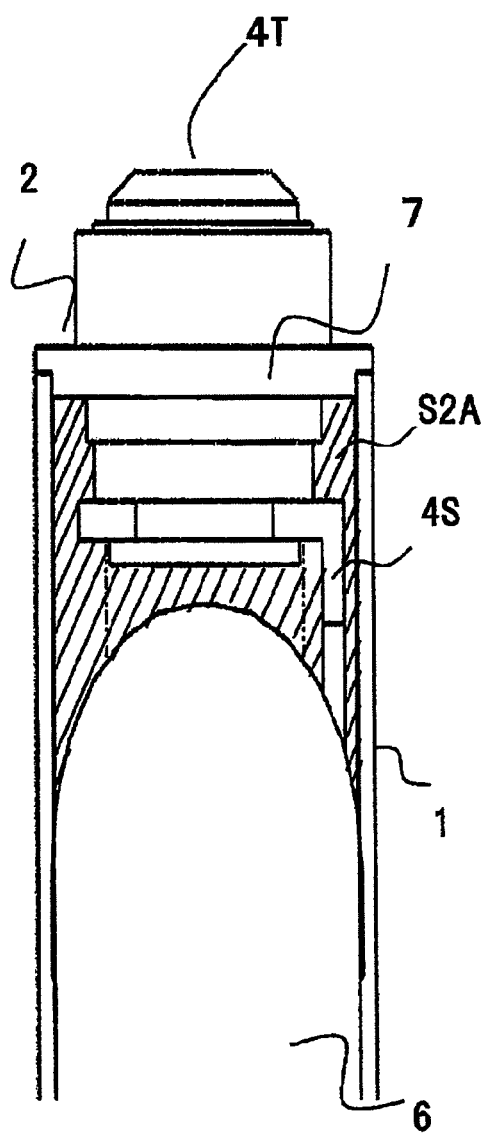

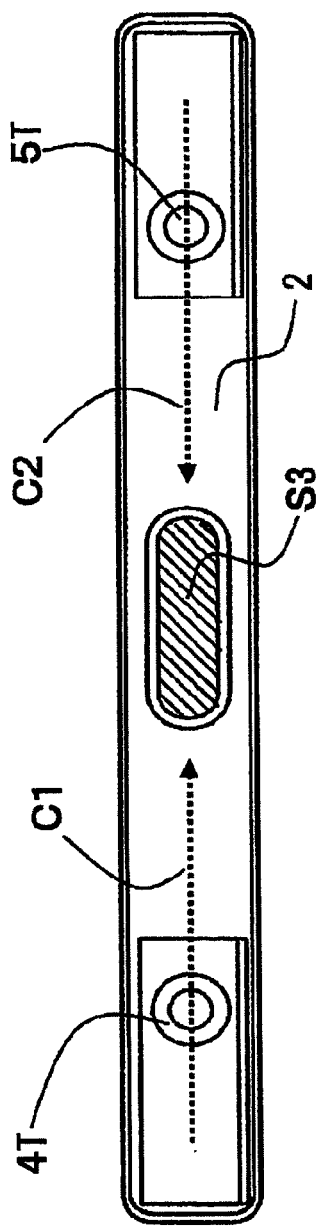
[FIG. 8]

[FIG. 9]
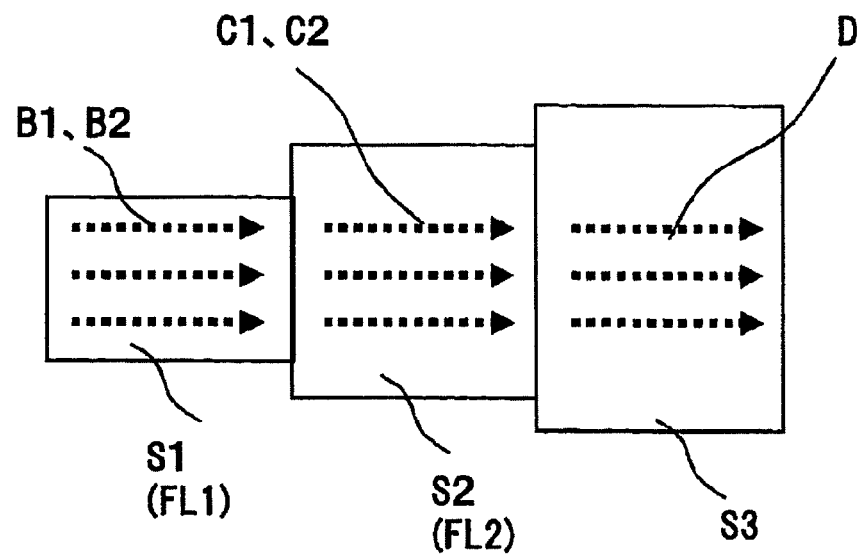
[FIG. 10]
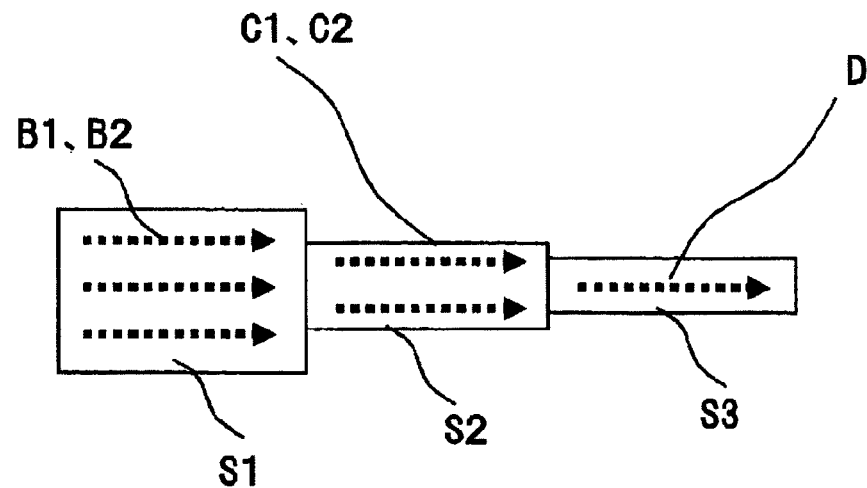

[FIG. 11]
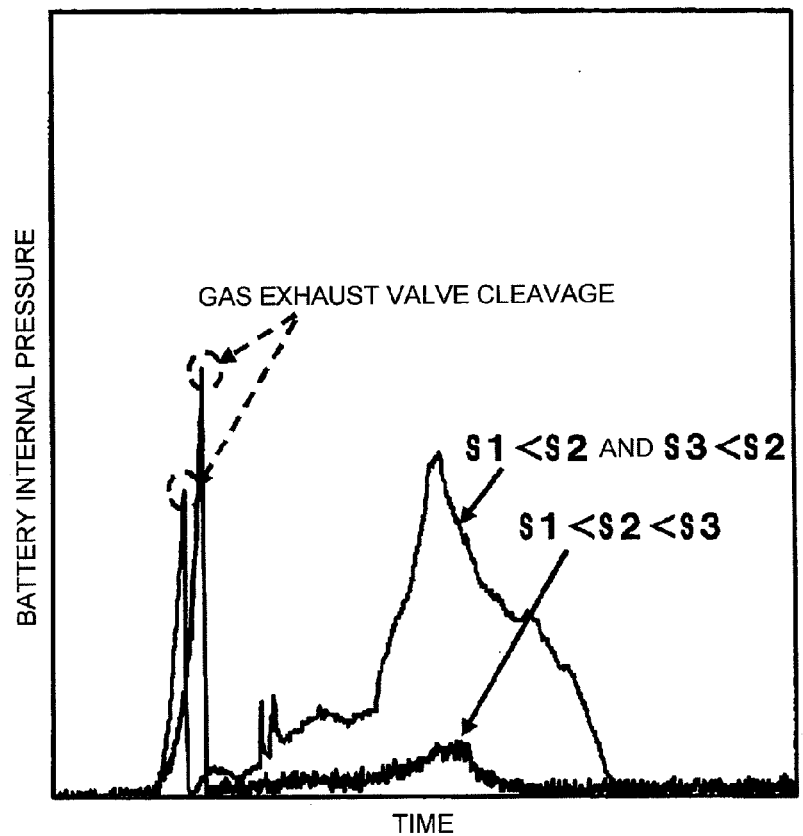

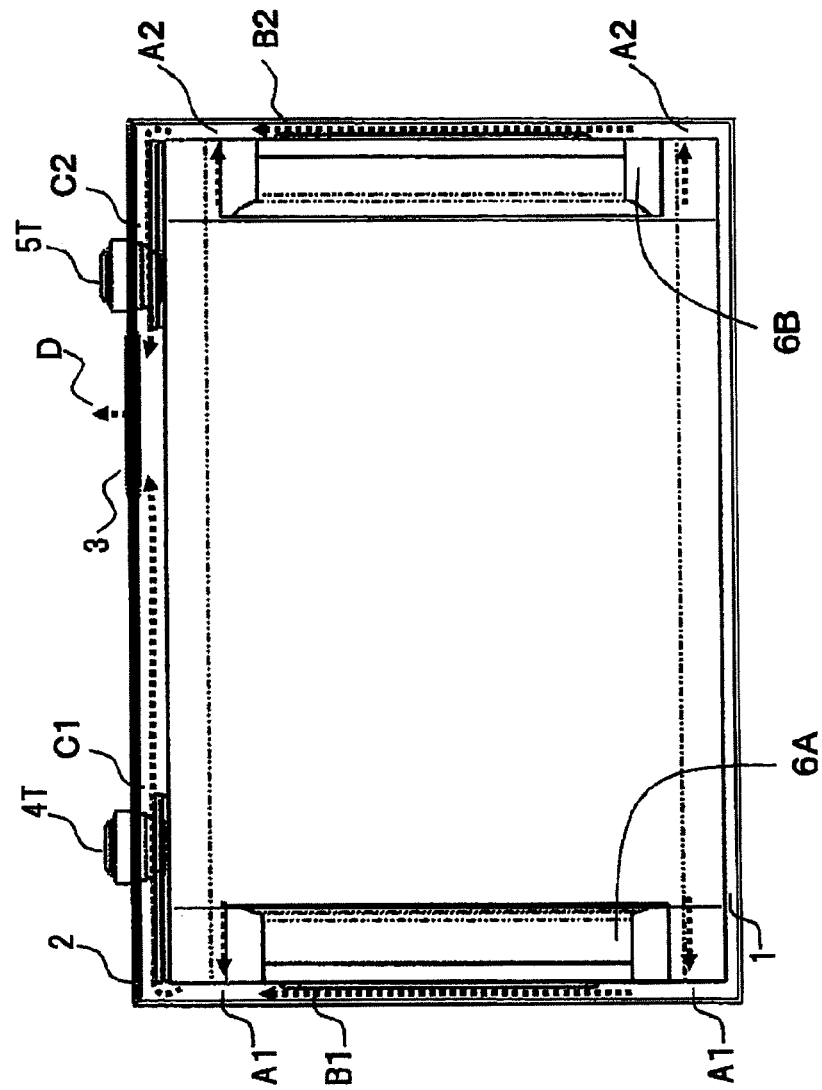
[FIG. 12]

SECONDARY BATTERY

TECHNICAL FIELD

The present invention relates to secondary batteries.

BACKGROUND ART

A lithium-ion secondary battery formed by making an electrode group by stacking sheet-shaped positive electrode and negative electrode with a separator interposed therebetween and housing this electrode group in a closed container made of metal or resin and filled with an electrolyte, the lithium-ion secondary battery provided with an external terminal connected to both electrodes of the electrode group, has been widely known.

In the above-described secondary battery, when the electrode group generates heat due to abnormal operations, a large amount of gas is sometimes generated, resulting in an increase in battery internal pressure. The abnormal operations include an overcharge, the application of heat, an internal short-circuit caused by an external load, and the like.

In the past, a gas release valve has been provided in a battery container to prevent an explosion of the battery container by discharging the gas from the gas release valve when the container internal pressure increases. However, there is a possibility that the gas release valve is obstructed as a result of the electrode group being moved by the container internal pressure at the time of the generation of gas.

In PTL 1, in a secondary battery in which a gas release valve is provided on the side of a container, the cross-sectional area (the first cross-sectional area) of the gap between an electrode group and the side of the container is made greater than the cross-sectional area (the second cross-sectional area) of the gap between the electrode group and the bottom face of the container so that the gas release valve is not obstructed even when the electrode group is moved by the gas generated from an electrode body.

CITATION LIST

Patent Literature

PTL 1: JP-A-2007-220418

SUMMARY OF INVENTION

Technical Problem

In the secondary battery described in PTL 1, the gas release valve is not obstructed even when the electrode group is moved, whereby the gas release valve can cleave reliably. However, depending on the relative sizes of the opening area of the gas release valve and the first and second cross-sectional areas, the gas that is continuously generated after the cleavage of the gas release valve sometimes makes insufficient the effect of reducing the internal pressure of the battery container.

Solution to Problem

A secondary battery according to a first aspect of the invention is a secondary battery including: a battery outer container in which a gas release valve and positive and negative electrode external terminals are provided; an electrode group in which positive and negative plates are stacked with a separator interposed therebetween and current collection portions are provided at both ends; and positive and negative electrode current collectors forming a current path from the current collection portions of the electrode group to the positive and negative electrode external terminals, wherein the cross-sectional area of a gas exhaust flow channel through which gas generated inside the electrode group is discharged from the gas release valve is set so as to increase in a downstream direction.

The secondary battery according to a second aspect of the invention is the secondary battery according to the first aspect in which the opening area of the gas release valve at the time of cleavage of the gas release valve is set so as to be greater than the cross-sectional area of a gas exhaust flow channel from the electrode group to the gas release valve.

The secondary battery according to a third aspect of the invention is the secondary battery according to the first or second aspect in which the gas exhaust flow channel is formed between the battery outer container and the electrode group and includes a first gas exhaust flow channel through which the gas discharged from the electrode group flows in a vertical direction when the gas reaches the gas release valve and a second gas exhaust flow channel through which the gas flowed thereinto from the first gas exhaust flow channel flows in a horizontal direction, and, when the cross-sectional area of the first gas exhaust flow channel is S1, the cross-sectional area of the second gas exhaust flow channel is S2, and the cross-sectional area of an opening of the gas release valve is S3, S1<S2<S3.

The secondary battery according to a fourth aspect of the invention is the secondary battery according to the third aspect in which the electrode group is formed by winding positive and negative plates with the separator placed therebetween and is a thin electrode group having a pair of front and back planar portions and curved portions connected to the planar portions in a continuous manner, the current collection portions are compressed stacked bodies, and the gas generated inside the electrode group is discharged from end faces of the curved portions.

The secondary battery according to a fifth aspect of the invention is the secondary battery according to the first or second aspect in which the electrode group is formed by winding positive and negative plates with the separator interposed therebetween and is a thin electrode group having a pair of front and back planar portions and curved portions connected to the planar portions in a continuous manner, the current collection portions are compressed stacked bodies, and the gas generated inside the electrode group is discharged from end faces of the curved portions.

The secondary battery according to a sixth aspect of the invention is the secondary battery according to the fifth aspect in which the outer container includes a battery case having a shape of a thin rectangular parallelepiped, the battery case formed of a pair of front and back wider faces, a pair of right and left narrower faces, and a bottom face, and a battery cover sealing an opening of the battery case, the opening facing the bottom face, by covering the opening, the battery cover having the gas release valve, the planar portions of the thin electrode group face the wider faces, both end faces of the electrode group face the narrower faces, and the curved portions of the electrode group face the battery cover, the first gas exhaust flow channel is a vertical flow channel formed in a space in which the both end faces of the electrode group face the narrower faces, and the second gas exhaust flow channel is a horizontal flow channel formed in a space in which the curved portions of the electrode group face the battery cover.

The secondary battery according to a seventh aspect of the invention is the secondary battery according to the sixth aspect in which, when the cross-sectional area of the first gas exhaust flow channel is S1, the cross-sectional area of the second gas exhaust flow channel is S2, and the cross-sectional area of an opening of the gas release valve is S3, S1<S2<S3.

Advantageous Effects of Invention

A battery of the invention can suppress an increase in the battery outer container internal pressure even after the cleavage of a gas release valve.

BRIEF DESCRIPTION OF DRAWINGS

FIG. 1 is an external perspective view showing a first embodiment of a secondary battery according to the invention.

FIG. 2 is an exploded perspective view of the secondary battery of FIG. 1.

FIG. 3A is a perspective view showing a wound electrode group in the secondary battery of FIG. 1.

FIG. 3B is a perspective view showing the wound electrode group of FIG. 3A in which a not-yet-coated portion is compressed in advance when it is connected to a current collector.

FIG. 4 is a longitudinal sectional view showing the flow of gas when a gas release valve cleaves in the secondary battery of FIG. 1.

FIG. 5 is a cross-sectional view taken on the line V-V indicated with an arrow of FIG. 4.

FIG. 6 is a longitudinal sectional view taken on the line VI-VI indicated with an arrow of FIG. 4.

FIG. 7 is a longitudinal sectional view taken on the line VII-VII indicated with an arrow of FIG. 4.

FIG. 8 is a plan view of FIG. 4.

FIG. 9 is a conceptual diagram showing that the flow channel cross-sectional areas of a gas flow channel in the first embodiment are S1<S2<S3.

FIG. 10 is a conceptual diagram showing a comparative example in which the flow channel cross-sectional areas of the gas flow channel are changed in such a way that S1>S2>S3.

FIG. 11 is a graph showing a change in the battery internal pressure when a forced internal short-circuit is established in the secondary battery.

FIG. 12 is a longitudinal sectional view showing the flow of gas when a gas release valve cleaves in a second embodiment of the thin lithium-ion secondary battery according to the invention.

DESCRIPTION OF EMBODIMENTS

Embodiments in which the invention is applied to a lithium-ion secondary battery for a hybrid vehicle will be described with reference to the drawings.

First Embodiment

As shown in FIGS. 1 and 2, a thin lithium-ion secondary battery has a thin rectangular parallelepiped-like appearance. This secondary battery has a closed-end metal battery case 1 and a flat plate metal battery cover 2 with a contour coinciding with an opening of the battery case 1. The battery case 1 is made of an aluminum alloy material, for example, and is formed into a thin rectangular parallelepiped with a pair of wider faces 1W, a pair of long and thin narrower faces 1N, and a bottom face 1B.

In this example, the battery cover 2 is made of an aluminum alloy. The outer contour of the battery cover 2 is bonded to the inner periphery of an opening 10 of the battery case 1 by laser (beam) welding, whereby the opening 10 of the battery case 1 is sealed. The battery case 1 and the battery cover 2 form a battery outer container.

In the center of the battery cover 2, a gas release valve 3 for discharging gas to the outside by cleaving at a previously set pressure when the pressure inside the battery outer container increases is provided. The gas release valve 3 is a thin film member made of almost the same metal material as that of the battery cover 2 and is bonded to the battery cover 2 by laser welding or the like.

In the internal space of the battery outer container, a package-like insulating sheet 12 is housed, and a wound electrode group 6 is housed in the insulating sheet 12. As a result, the wound electrode group 6 is insulated from the battery outer container. Furthermore, in the battery outer container, an electrolyte or the like is housed.

Incidentally, the secondary battery of this embodiment, in which the battery case 1 and the battery cover 2 have no polarity, is neutral.

As shown in FIG. 3A, the wound electrode group 6 has a flat wound structure in which a belt-like separator 6C, a belt-like negative plate 6E, a belt-like separator 6C, and a belt-like positive plate 6D are sequentially stacked and wound. At an end of the wound electrode group 6 from which the winding is started, the separator 6C is wound several times, and, around the periphery thereof, the positive and negative plates 6D and 6E are wound with the separator 6C interposed therebetween. At an end of the wound electrode group 6 at which the winding is ended, the separator 6C is wound several times, and, to prevent unwinding, the outermost periphery of the separator 6C (the lowermost face in FIG. 2) is fixed with an adhesive tape (not shown).

The positive plate 6D is made by applying a positive-electrode active material mix to both sides of aluminum alloy foil. For example, a positive-electrode active material mix containing a lithium-containing transition metal multiple oxide such as lithium manganate is nearly evenly and uniformly applied (both sides of aluminum alloy foil are nearly evenly and uniformly coated with the positive-electrode active material mix). On both sides at one end of the aluminum alloy foil in a winding axis direction along a longitudinal direction (winding direction) thereof, a positive electrode not-yet-coated portion 6A which is not yet coated with the positive-electrode active material mix is formed. That is, in the positive electrode not-yet-coated portion 6A, the aluminum alloy foil (positive electrode current collector) is exposed.

The negative plate 6E is made by applying a negative-electrode active material mix to both sides of copper alloy foil. For example, a negative-electrode active material mix containing a carbon material, such as graphite, that can store and release a lithium ion is nearly evenly and uniformly applied. On both sides at the other end of the copper alloy foil in a winding axis direction along a longitudinal direction (winding direction) thereof, a negative electrode not-yet-coated portion 6B which is not yet coated with the negative-electrode active material mix is formed. That is, in the negative electrode not-yet-coated portion 6B, the copper alloy foil (negative electrode current collector) is exposed.

The separator 6C is formed of a microporous sheet material through which a lithium ion can pass. In this example, a polyethylene sheet of tens of micrometers in thickness is used.

As shown in FIG. 2, at both ends of the battery cover 2, through holes (not shown) for connecting the inside of the battery with the outside are made, and a positive electrode conductive member 4 and a negative electrode conductive member 5 are placed through the through holes via insulating seal materials 7. The positive electrode conductive member 4 and the negative electrode conductive member 5 which are exposed to the outside of the battery cover 2 are used as positive and negative electrode external terminals 4T and 5T and connect the wound electrode group 6 and an electrical load and a charging power supply located outside the battery. The positive electrode conductive member 4 and the negative electrode conductive member 5 which extend inside the battery case are used as a positive electrode current collector 4S and a negative electrode current collector 5S. The positive electrode current collector 4S is joined to the positive electrode not-yet-coated portion 6A in a planar positive electrode-side joint part 4A, and the negative electrode current collector 5S is joined to the negative electrode not-yet-coated portion 6B in a planar negative electrode-side joint part 5A.

The wound electrode group 6 is integrated with the battery cover 2 by the positive and negative electrode conductive members 4 and 5 and is supported by the battery cover 2 in a cantilever state.

FIG. 3B is a perspective view of the electrode group 6 in which the central areas of the not-yet-coated portions 6A and 6B are compressed. The electrode group 6 has planar portions 6P formed in the center thereof and compressed stacked body compressed planar portions 6S formed in the central areas at both ends thereof. In upper and lower parts of the planar portions 6P of the electrode group 6, curved portions 6W associated with the winding are formed. The curved portions 6W are formed as a result of the positive and negative electrode foil having been bent at the time of winding, and, in the curved portions 6W, the positive and negative electrode foil is stacked but is not compressed. In FIG. 3B, the four corners of the curved portions 6W are called stacked body curved end portions 6E.

In the electrode group 6 of FIG. 3B, inside the battery case 1, the front and back planar portions 6P face the pair of wider faces 1W of the battery case 1 with a predetermined space left therebetween and the four curved end portions 6E face the right and left narrower faces 1N of the battery case 1 with a predetermined space left therebetween. Moreover, the upper face of the curved portion 6W is disposed in such a way as to face the inner face of the battery cover 2 with a predetermined space left therebetween, and the lower face of the curved portion 6W is disposed in such a way as to face the bottom face 1B of the battery case 1 with a predetermined space left therebetween. These four spaces are areas that can become flow channels of the gas generated inside the electrode group 6. The gas flow channels will be described later.

Areas in which the wound electrode group 6 is joined to the positive and negative electrode current collectors 4S and 5S in the not-yet-coated portions 6A and 6B are the above-described stacked body compressed planar portions 6S. The stacked body compressed planar portions 6S of the positive and negative electrode foil that has been wound several times are ultrasonically joined to the positive and negative electrode current collectors 4S and 5S, and the gap between the positive and negative electrode foil is also joined.

Therefore, most of the gas generated by a short-circuit, the generation of heat, or the like inside the wound electrode group 6 is not discharged to the outside of the electrode group from the stacked body compressed planar portions 6S.

On the other hand, since the curved portions 6W of the electrode group 6 are not compressed, at the four ends 6E of the curved portions 6W, minute spaces are formed between the positive and negative electrode foil forming the stacked body. These minute spaces can become exhaust flow channels of the gas generated inside the electrode group. Thus, the stacked body curved end portions 6E at the four corners of the electrode group 6 function as gas exhaust portions.

When gas is generated by the generation of heat caused by a short-circuit or the like inside the wound electrode group 6, the internal pressure of the battery outer container increases and the gas release valve 3 cleaves. This prevents an explosion of the battery outer container, and the generated gas is discharged from the gas release valve 3 through the following gas exhaust flow channels.

The gas exhaust flow channels through which the gas generated inside the battery case 1 is discharged from the gas release valve 3 will be described.

In the curved portion ends 6E, minute gaps through which the gas flows are present between a plurality of stacked foil. Dashed arrows A1 represent the flows in the minute gaps in the positive electrode-side curved ends 6E, and dashed arrows A2 represent the minute gap flows in the negative electrode-side gas exhaust portions 6E. That is, as indicated with the dashed arrows A1 and A2 in FIG. 4, the gas generated inside the wound electrode group 6 flows in a winding axis direction of the wound electrode group 6 inside the curved portion ends 6E.

The gas discharged from the curved ends 6E of the electrode group 6 flows into vertical flow channels formed as a result of the four curved ends 6E of the electrode group 6 facing the right and left narrower faces 1N of the battery case 1 with a predetermined space left therebetween and flows toward the battery cover 2 as gases B1 and B2. These vertical flow channels are referred to as first gas exhaust flow channels FL1.

The gas that has flowed through the first gas exhaust flow channels FL1 reaches the gas release valve 3 after passing through horizontal flow channels formed as a result of the upper face of the curved portion 6W facing the inner face of the battery cover 2 with a predetermined space left therebetween. These horizontal flow channels are referred to as second gas exhaust flow channels FL2.

The gases A1 and A2 inside the electrode group 6 reach the space between the both end faces of the electrode group 6 and the battery case narrower faces 1N and vertically flow through the first gas exhaust flow channels FL1 toward the battery cover 2. Furthermore, this gas flow flows into the horizontal flow channels which are the second gas exhaust flow channels FL2 between the curved portion 6W of the electrode group 6 and the battery cover 2 and flows toward the gas release valve 3. In FIG. 4, the vertical gas flowing toward the battery cover 2 on the positive electrode side and the vertical gas flowing toward the battery cover 2 on the negative electrode side are indicated with dashed arrows B1 and B2. Moreover, the horizontal gas flowing toward the gas release valve 3 on the positive electrode side and the horizontal gas flowing toward the gas release valve 3 on the negative electrode side are indicated with dashed arrows C1 and C2. The horizontal gas flowing toward the gas release valve 3, the horizontal gas indicated with the arrows C1 and C2, is eventually discharged to the outside through a cleavage opening of the gas release valve 3 as indicated with an arrow D.

As shown in FIGS. 4 and 5, when the cross-sectional areas of the first gas exhaust flow channels FL1 formed in the space between the both end faces of the electrode group 6 and the battery case narrower faces 1N are represented as S1A and S1B and the sum of the cross-sectional areas is represented as S1, they are expressed as $$S1=S1A+S1B \qquad \text{Expression (1)}.$$

FIG. 6 is a sectional view of principal portions, the sectional view of FIG. 4 taken on the section line VI-VI, and FIG. 7 is a sectional view of principal portions, the sectional view of FIG. 4 taken on the section line VII-VII. Of the gas exhaust flow channels from the curved ends 6E of the electrode group 6 to the gas release valve 3, in the second gas exhaust flow channels FL2 through which the horizontal gases C1 and C2 flow, the positive and negative electrode conductive members 4 and 5 extend while being orthogonal to the flow channels and the seal materials 7 also project, and this is a narrow space including many obstacles. Therefore, the minimum flow channel cross-sectional areas of the second gas exhaust flow channels FL2 are the effective cross-sectional areas of the horizontal flow channels. Here, this effective cross-sectional area is a value obtained by excluding the area of the above-described obstacle protruding into the horizontal flow channel from the cross-sectional area of the flow channel zoned by the curved portions 6W of the electrode group 6 and the battery cover 2. The area of the obstacle is the area of the obstacle orthogonal to the flow channel.

As shown in FIGS. 6 and 7, when the minimum flow channel cross-sectional areas of the second gas exhaust flow channels FL2 through which the horizontal gas indicated with the dashed arrows C1 and C2 of FIG. 4 flows are represented as S2A and S2B and the sum of the minimum flow channel cross-sectional areas is represented as S2, they are expressed as $$S2=S2A+S2B \qquad \text{Expression (2)}.$$

As shown in FIG. 8, the opening area of the gas release valve 3 provided in the center of the battery cover 2 is S3 and is the maximum area of the cleavage opening. The cleavage opening does not necessarily open to the opening area S3, but the cleavage opening generally takes on the value of the opening area S3 or a value close to the opening area S3.

In the secondary battery according to the embodiment of the invention, the flow channel cross-sectional areas S1, S2, and S3 are set so that S1<S2<S3, and the flow channel cross-sectional area sequentially increases in a downstream direction.

When the wound electrode group 6 generates heat, gas is generated and the pressure inside the battery outer container increases. When the gas pressure becomes greater than or equal to the cleavage pressure of the gas release valve 3, the gas release valve 3 cleaves. As a result, the pressure inside the battery outer container temporarily decreases. After the cleavage of the gas release valve 3, the gas is continuously generated from the electrode group 6. This gas flows through the second gas exhaust flow channels FL2 from the first gas exhaust flow channels FL1 as the gas indicated with the dashed arrows A1, A2, B1, B2, C1, C2, and D and is discharged to the outside of the battery case 1 through the cleaved opening of the gas release valve 3.

As shown in FIG. 9, in the secondary battery of this embodiment, at the time of the discharge of gas after the cleavage of the gas release valve 3, the gas exhaust ability of the second gas exhaust flow channels FL2 through which the gas indicated with the dashed arrows C1 and C2 flows is higher than the gas exhaust ability of the first gas exhaust flow channels FL1 through which the gas indicated with the dashed arrows B1 and B2 flows. Moreover, the gas exhaust ability of the cleaved opening of the gas release valve 3 is higher than that of the second gas exhaust flow channels FL2 through which the gas indicated with the dashed arrows C1 and C2 flows. Therefore, when the gas flow indicated with the dashed arrows C1 and C2 flows to the outside through the gas release valve 3 as indicated with the dashed arrow D, it is possible to suppress an increase in the pressure of the second gas exhaust flow channels FL2. This suppresses an increase in the pressure inside the battery outer container and prevents an accident such as an explosion of the battery outer container.

As in a comparative example shown in FIG. 10, when the flow channel cross-sectional areas S1, S2, and S3 are set so that S1>S2>S3, the gas exhaust ability of the second gas exhaust flow channels FL2 through which the gas indicated with the dashed arrows C1 and C2 flows is lower than the gas exhaust ability of the first gas exhaust flow channels FL1 through which the gas indicated with the dashed arrows B1 and B2 flows. Furthermore, the gas exhaust ability by the opening of the gas release valve 3 indicated with the dashed arrow D is lower than the gas exhaust ability of the second gas exhaust flow channels FL2.

When the gas exhaust abilities of a plurality of flow channels from the electrode group (gas generation source) 6 to the gas release valve 3 are set as in the comparative example, it is impossible to reduce the battery case internal pressure effectively as follows.

For example, when the maximum gas exhaust flow rate of the gas indicated with the dashed arrows B1 and B2 in the first gas exhaust flow channels FL1 is 10 L/S and the amount of generated gas, that is, the flow rate of the gas indicated with the dashed arrows A1 and A2 is 10 L/S, since the maximum gas exhaust flow rate in the second gas exhaust flow channels FL2 is lower than 10 L/S, the pressure of the first gas exhaust flow channels FL1 increases.

Likewise, since the maximum gas discharge amount of the gas release valve 3 is smaller than the maximum gas discharge amount in the second gas exhaust flow channels FL2 indicated with the dashed arrows C1 and C2, the pressure of the second gas exhaust flow channels FL2 increases.

Therefore, there is a possibility that the internal pressure of the battery outer container does not decrease even though the gas release valve 3 cleaved due to an increase in the pressure inside the battery outer container by the gas generated at the occurrence of an abnormality.

On the other hand, in the secondary battery of this embodiment, the cross-sectional area of the gas flow channel sequentially increases in a downstream direction such that the cross-sectional areas of the gas flow channels are S1<S2<S3. As a result, the closer to the downstream part, the higher the gas exhaust ability, and the gas is discharged very smoothly, and there is no possibility that the pressure inside the battery outer container increases after the gas release valve 3 cleaves.

[Forced Internal Short-Circuit Test]

A lithium-ion battery in which the gas exhaust flow channel area was varied was produced, and a forced internal short-circuit test in which an abnormal operation was assumed was conducted to check the effectiveness of the invention.

In the forced internal short-circuit test, a thin lithium-ion secondary battery in which the flow channel cross-sectional areas were S1<S2<S3 was made and used as Sample 1 (the embodiment), and a thin lithium-ion secondary battery in which the flow channel cross-sectional areas were S1<S2 and S3<S2 was made and used as Sample 2. Then, a short-circuit was established by piercing a needle with a diameter of 5 mm and a point angle of 60° in the center of the battery wider face, and the internal pressure was then measured until the generation of gas was ended. Incidentally, the battery capacity of the electrode group 6 used in Sample 1 and the battery capacity of the electrode group 6 used in Sample 2 are nearly identical with each other.

As shown in FIG. 11, in the thin lithium-ion secondary battery of Sample 2, the internal pressure increased due to a large amount of gas generated by the forced internal short-circuit, and the gas release valve 3 cleaved at a previously set cleavage pressure. However, since the discharge of gas was not subsequently performed smoothly, the pressure inside the battery outer container increased to a pressure slightly higher than the cleavage pressure of the gas release valve 3.

In general, the thin lithium-ion secondary battery is safe at a pressure close to the cleavage pressure, but, when the thin lithium-ion secondary battery is exposed to prolonged repeated overheating, repeated stress, or the like, there is a possibility that durability of the battery outer container is reduced due to an increase in pressure near the cleavage pressure.

On the other hand, in the thin lithium-ion secondary battery of Sample 1, since the pressure increased due to a large amount of gas generated by the forced internal short-circuit, the gas release valve 3 cleaved at the cleavage pressure, and the discharge of gas was subsequently performed smoothly, an increase in pressure was suppressed.

Incidentally, the cleavage pressure of the gas release valve 3 of Sample 1 is different from the cleavage pressure of the gas release valve 3 of Sample 2, but this difference is variations in the product.

Second Embodiment

A second embodiment of the thin lithium-ion secondary battery according to the invention will be described with reference to FIG. 12. Incidentally, in the drawing, the same components as those of the first embodiment or components corresponding to those of the first embodiment are identified with the same reference characters and their descriptions will be omitted. The second embodiment is obtained by displacing the position of the gas release valve in the first embodiment from the center of the battery cover.

As shown in FIG. 12, in the thin lithium-ion secondary battery, the gas release valve 3 is displaced from the center of the battery cover 2. Therefore, in the gas flow channels along the battery cover 2, the length of the flow channel indicated with the dashed arrow C1 is different from the length of the flow channel indicated with the dashed arrow C2. However, in the size of a practical thin lithium-ion secondary battery for a hybrid vehicle, the influence of the displacement of the gas release valve 3 on the battery cover 2 on the gas discharge performance is negligible. That is, the second embodiment produces the same effect as that of the first embodiment.

MODIFIED EXAMPLES

The above description is an embodiment and the invention can be applied to secondary batteries with various structures that do not depart from the spirit of the invention. The main feature of the invention is that the cross-sectional area of the gas exhaust flow channel through which the gas generated inside the electrode group 6 flows until the gas is discharged from the gas release valve 3 is increased as the gas exhaust flow channel becomes closer to a downstream part. Therefore, the secondary battery having this main feature can be implemented after being modified as follows.

(1) The separator 6C is wound several times at an end of the electrode group 6 from which the winding is started and is used as a substitute for an axial core of the electrode group 6. However, the invention can also be applied to an electrode group in which a separator, a negative plate, a separator, and a positive plate are wound on the outer periphery of an axial core.

(2) In the above embodiment, ends of the positive and negative electrode conductive members 4 and 5 are joined to the not-yet-coated portions 6A and 6B of the electrode group 6, and the other ends of the conductive members 4 and 5 that penetrate the battery cover 2 and project to the outside of the container are used as the external terminals 4T and 5T. However, the secondary battery according to the invention is not limited to such shapes and structures of the conductive members.

(3) In the above embodiment, along and thin rectangular opening facing the battery case bottom face 1B is covered with the battery cover 2 and the gas release valve 3 is provided in the battery cover 2. However, the invention can also be applied to a secondary battery in which the wider face 1W of the battery case 1 is sealed with the battery cover 2 and the gas release valve 3 is provided in the battery cover 2.

(4) The embodiment has described that the cross-sectional area of the first gas exhaust flow channel FL1 is greater than the cross-sectional area of the second gas exhaust flow channel FL2. However, the invention also includes a case in which the cross-sectional area of the first gas exhaust flow channel FL1 is nearly equal to the cross-sectional area of the second gas exhaust flow channel FL2. Therefore, the invention can be applied to all secondary batteries in which the gas generated in the electrode group is discharged from the gas release valve and the opening area at the time of cleavage of the gas release valve is set to be greater than the cross-sectional area of the gas exhaust flow channel from the electrode group to the gas release valve.

(5) The invention can be applied to various secondary batteries having a wound electrode group, such as a nickel metal hydride secondary battery, in addition to the lithium-ion secondary battery. Moreover, the invention can also be applied to various lithium-ion capacitors having a wound electrode group.

The invention claimed is:
1. A secondary battery comprising:
a battery outer container; and
a wound electrode group that is located within the battery outer container;
wherein the wound electrode group is formed by winding a thin electrode group along a winding axis; wherein the thin electrode group includes one or more belt-like positive plates that are alternately stacked with one or more belt-like negative plates with one of one or more belt-like separators interposed there between;
wherein the wound electrode group includes:
a front and a back planar portions,
a first side portion perpendicular to the winding axis and separated along the winding axis from a second side portion that is parallel to the first side, a first curved portion parallel to the winding axis,
a second curved portion separated along an axis perpendicular to the winding axis that is parallel to the first curved portion,
a first compressed region along the first side portion that forms a negative electrode,
a second compressed region along the second side portion that forms a positive electrode,
a positive current collector forming a positive current path from the positive electrode to a positive electrode external electrode; and
a negative current collector forming a negative current path from the negative electrode to a negative electrode external electrode;
wherein battery outer container includes:
the positive external electrode,
the negative external electrode,
a battery case, and
a battery cover, wherein the battery cover seals an opening of the battery case and includes a gas release valve that has a cross sectional area S3;
wherein the first side portion of the wound electrode group is proximate to a first side of the battery case and forms a first flow channel between the first side of the battery case and the first side portion of the wound electrode group, wherein the first flow channel has a cross sectional area B1;
wherein the second side portion of the wound electrode group is proximate to a second side of the battery case and forms a second flow channel between the second side of the battery case and the second side portion of the wound electrode group, wherein the second flow channel has a cross sectional area B2;
wherein the first curved portion of the wound electrode group is proximate to the battery cover and forms a third flow channel between the battery cover and the first curved portion, wherein the third flow channel has a cross sectional area S2; and
wherein S3 is larger than a minimum of B1, B2 and S2.

2. The secondary battery of claim 1, wherein the battery case has a thin rectangular parallelepiped shape.

3. The secondary battery of claim 1, wherein the battery case is made of an aluminum alloy material.

4. The secondary battery of claim 1, wherein the valve is a thin film member made of a same material as the battery cover.

5. The secondary battery of claim 1, wherein the valve is located between the positive external electrode and the negative external electrode along the winding axis.

6. A battery outer container comprising:
a positive external electrode,
a negative external electrode,
a battery case, and
a battery cover, wherein the battery cover seals an opening of the battery case and includes a gas release valve that has a cross sectional area S3;
wherein the battery case encloses a wound electrode group;
wherein the wound electrode group is formed by winding a thin electrode group along a winding axis; wherein the thin electrode group includes one or more belt-like positive plates that are alternately stacked with one or more belt-like negative plates with one of one or more belt-like separators interposed there between;
wherein the wound electrode group includes:
a front and a back planar portions,
a first side portion perpendicular to the winding axis and separated along the winding axis from a second side portion that is parallel to the first side,
a first curved portion parallel to the winding axis,
a second curved portion separated along an axis perpendicular to the winding axis that is parallel to the first curved portion,
a first compressed region along the first side portion that forms a negative electrode,
a second compressed region along the second side portion that forms a positive electrode,
a positive current collector forming a positive current path from the positive electrode to a positive electrode external electrode; and
a negative current collector forming a negative current path from the negative electrode to a negative electrode external electrode;
wherein the first side portion of the wound electrode group is proximate to a first side of the battery case and forms a first flow channel between the first side of the battery case and the first side portion of the wound electrode group, wherein the first flow channel has a cross sectional area B1;
wherein the second side portion of the wound electrode group is proximate to a second side of the battery case and forms a second flow channel between the second side of the battery case and the second side portion of the wound electrode group, wherein the second flow channel has a cross sectional area B2;
wherein the first curved portion of the wound electrode group is proximate to the battery cover and forms a third flow channel between the battery cover and the first curved portion, wherein the third flow channel has a cross sectional area S2; and
wherein S3 is larger than a minimum of B1, B2 and S2.

7. The outer battery container of claim 6, wherein the battery case has a thin rectangular parallelepiped shape.

8. The outer battery container of claim 6, wherein the battery case is made of an aluminum alloy material.

9. The outer battery container of claim 6, wherein the valve is a thin film member made of a same material as the battery cover.

10. The outer battery container of claim 6, wherein the valve is located between the positive external electrode and the negative external electrode along the winding axis.

* * * * *